US008815990B2

(12) United States Patent
Kimura et al.

(10) Patent No.: US 8,815,990 B2
(45) Date of Patent: Aug. 26, 2014

(54) STABILIZER COMPOSITION

(75) Inventors: Yoshikazu Kimura, Osaka (JP);
Tetsuya Shintaku, New York, NY (US)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/259,112

(22) PCT Filed: Apr. 16, 2010

(86) PCT No.: PCT/JP2010/057200
§ 371 (c)(1),
(2), (4) Date: Dec. 9, 2011

(87) PCT Pub. No.: WO2010/123088
PCT Pub. Date: Oct. 28, 2010

(65) Prior Publication Data
US 2012/0088875 A1    Apr. 12, 2012

(30) Foreign Application Priority Data

Apr. 24, 2009 (JP) ................................. 2009-106165
Apr. 24, 2009 (JP) ................................. 2009-106166

(51) Int. Cl.
C08K 5/00 (2006.01)
C08K 5/526 (2006.01)
C08K 5/134 (2006.01)
C08K 5/053 (2006.01)

(52) U.S. Cl.
CPC ............... *C08K 5/053* (2013.01); *C08K 5/526* (2013.01); *C08K 5/134* (2013.01)
USPC .......................................... 524/291; 525/391

(58) Field of Classification Search
None
See application file for complete search history.

(56) References Cited

U.S. PATENT DOCUMENTS

| 4,187,212 A | 2/1980 | Zinke et al. |
| 4,290,941 A | 9/1981 | Zinke et al. |
| 5,045,581 A | 9/1991 | Takata et al. |
| 5,128,398 A | 7/1992 | Sasaki et al. |
| 7,098,292 B2 * | 8/2006 | Zhao et al. ................. 528/272 |
| 2002/0002249 A1 * | 1/2002 | Fukuda ........................ 525/391 |
| 2008/0293856 A1 * | 11/2008 | Kumar et al. ................ 524/123 |

FOREIGN PATENT DOCUMENTS

| JP | 51-109050 A | 9/1976 |
| JP | 1-168643 A | 7/1989 |
| JP | 1-170626 A | 7/1989 |
| JP | 3-88841 A | 4/1991 |
| JP | 7-207109 A | 8/1995 |
| JP | 2002-60638 A | 2/2002 |
| JP | 2002-69314 A | 3/2002 |
| JP | 2006-225444 A | 8/2006 |

OTHER PUBLICATIONS

International Preliminary Report on Patentability for International Application No. PCT/JP2010/057200, mailed on Dec. 1, 2011.
English machine translation by JPO for JP 2002-60638-A, published Feb. 26, 2002.
English machine translation by JPO for JP 2002-69314-A, published Mar. 8, 2002.
English machine translation by JPO for JP 7-207109-A, published Aug. 8, 1995.
The First Office Action (including English translation), dated Feb. 4, 2013, issued in corresponding Chinese Patent Application No. 201080018369.5.
Written Opinion of the Hungarian Intellectual Property Office issued in Singapore Patent Application No. 201106851-7, mailed on Sep. 7, 2012.
International Search Report, dated Jul. 20, 2010 in PCT/JP2010/057200.

* cited by examiner

*Primary Examiner* — Susannah Chung
*Assistant Examiner* — Robert T Butcher
(74) *Attorney, Agent, or Firm* — Birch, Stewart, Kolasch & Birch, LLP

(57) ABSTRACT

A stabilizer composition comprising a phenyl acrylate compound or phosphite compound, and a sugar alcohol.
A thermoplastic polymer composition comprising a phenyl acrylate compound or phosphite compound, and a sugar alcohol, wherein the total weight of the phenyl acrylate compound or phosphite compound, and the sugar alcohol is 0.001 to 3 parts by weight with respect to 100 parts by weight of the thermoplastic polymer.

5 Claims, No Drawings

STABILIZER COMPOSITION

TECHNICAL FIELD

The present invention relates to a stabilizer composition.

BACKGROUND ART

Thermoplastic polymers are excellent in transparency and excellent also in impact resistance, thus, widely used for food packaging vessels and daily miscellaneous goods. These thermoplastic polymers, however, have a problem of deterioration of processing stability due to lowering of flowability in molding processing.

As a thermoplastic polymer composition excellent in processing stability, there is a suggestion on a thermoplastic polymer composition comprising 2,4-di-t-amyl-6-[1-(3,5-di-t-amyl-2-hydroxyphenyl)ethyl]phenyl acrylate contained in a polybutadiene rubber, a kind of thermoplastic polymer (patent document 1).

Further, as a thermoplastic polymer composition excellent in processing stability, there is a suggestion on a thermoplastic polymer composition comprising tris(2,4-di-t-butylphenyl)phosphite contained in a polypropylene, a kind of thermoplastic polymer (patent document 2).

[Patent document 1] JP-A No. 1-168643 (examples)
[Patent document 2] JP-A No. 51-109050 (examples)

DISCLOSURE OF THE INVENTION

Recently, thermoplastic polymer compositions having further improved processing stability are required.

For solving such a problem, the present inventors have investigated, leading consequently to the present invention.

That is, the present invention provides the following [1] to [7].

[1]. A stabilizer composition comprising a compound represented by formula (1):

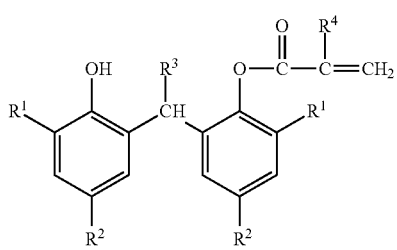

wherein, $R^1$ and $R^2$ each independently represent an alkyl group having 1 to 8 carbon atoms, aryl group having 6 to 12 carbon atoms or aralkyl group having 7 to 18 carbon atoms; $R^3$ represents a hydrogen atom or alkyl group having 1 to 3 carbon atoms, and $R^4$ represents a hydrogen atom or methyl group;

or a compound represented by formula (2):

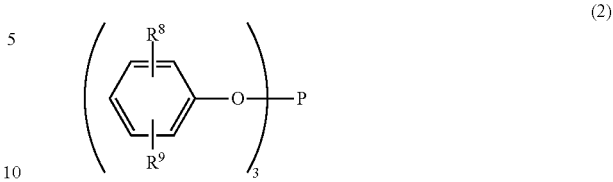

wherein, $R^7$ and $R^9$ each independently represent a hydrogen atom, alkyl group having 1 to 9 carbon atoms, cycloalkyl group having 5 to 8 carbon atoms, alkylcycloalkyl group having 6 to 12 carbon atoms, aralkyl group having 7 to 12 carbon atoms or phenyl group; and
a compound represented by formula (3)

$$C_nH_{2n+2}O_n \quad (3)$$

wherein, n represents an integer of 4 to 12.

[2]. The stabilizer composition according to [1], wherein the compound represented by formula (1) is 2,4-di-t-amyl-6-[1-(3,5-di-t-amyl-2-hydroxyphenyl)ethyl]phenyl acrylate or 2-t-butyl-6-(3-t-butyl-2-hydroxy-5-methylbenzyl)-4-methylphenyl acrylate.

[3]. The stabilizer composition according to [1], wherein the compound represented by formula (2) is tris(2,4-di-t-butylphenyl)phosphite.

[4]. The stabilizer composition according to any one of [1] to [3], wherein the compound represented by formula (3) is allitol, iditol, galactitol, sorbitol, talitol or mannitol.

[5]. A thermoplastic polymer composition comprising a thermoplastic polymer, a compound represented by formula (1):

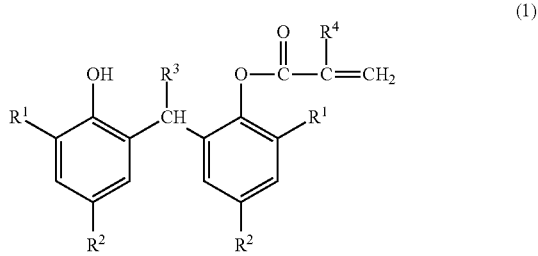

wherein, $R^1$ and $R^2$ each independently represent an alkyl group having 1 to 8 carbon atoms, aryl group having 6 to 12 carbon atoms or aralkyl group having 7 to 18 carbon atoms; $R^3$ represents a hydrogen atom or alkyl group having 1 to 3 carbon atoms, and $R^4$ represents a hydrogen atom or methyl group;

or a compound represented by formula (2):

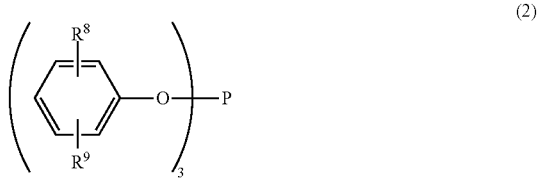

wherein, $R^8$ and $R^9$ each independently represent a hydrogen atom, alkyl group having 1 to 9 carbon atoms, cycloalkyl group having 5 to 8 carbon atoms, alkylcycloalkyl group having 6 to 12 carbon atoms, aralkyl group having 7 to 12 carbon atoms or phenyl group; and a compound represented by formula (3):

$$C_nH_{2n+2}O_n \quad (3)$$

wherein, n represents an integer of 4 to 12, wherein the total weight of the compound represented by formula (1) or formula (2) and the compound represented by formula (3) is 0.001 to 3 parts by weight with respect to 100 parts by weight of the thermoplastic polymer.

[6]. A method of producing a thermoplastic polymer composition, having a step of mixing the stabilizer composition according to any one of [1] to [4] with a thermoplastic polymer.

[7]. Use of the stabilizer composition according to any one of [1] to [4], for stabilizing a thermoplastic polymer during processing thereof.

MODES FOR CARRYING OUT THE INVENTION

The present invention will be illustrated in detail below.

The composition of the present invention comprises the above-described compound represented by formula (1) (hereinafter, referred to as compound (1) in some cases) or the above-described compound represented by formula (2) (hereinafter, referred to as compound (2) in some cases), and the compound represented by formula (3) (hereinafter, referred to as compound (3) in some cases).

In the compound (1), $R^1$ and $R^2$ in the formula each independently represent an alkyl group having 1 to 8 carbon atoms, aryl group having 6 to 12 carbon atoms or aralkyl group having 7 to 18 carbon atoms. $R^1$ and $R^2$ include alkyl groups having 1 to 8 carbon atoms such as, for example, a methyl group, ethyl group, n-propyl group, isopropyl group, n-butyl group, isobutyl group, sec-butyl group, t-butyl group, n-pentyl group, t-amyl group ($-C(CH_3)_2CH_2CH_3$), 2-ethylhexyl group, cyclohexyl group and the like, aryl groups having 6 to 12 carbon atoms such as, for example, a phenyl group and the like, aralkyl groups having 7 to 18 carbon atoms such as, for example, a benzyl group and the like; etc.

Preferable are alkyl groups having a tertiary carbon such as a t-butyl group, t-amyl group and the like, and more preferable are a t-amyl group and the like.

$R^3$ represents a hydrogen atom or alkyl group having 1 to 3 carbon atoms. The alkyl group includes, for example, a methyl group, ethyl group, n-propyl group, isopropyl group and the like. $R^3$ includes preferably a hydrogen atom or methyl group and the like.

$R^4$ represents a hydrogen atom or methyl group, particularly preferably a hydrogen atom.

Specific examples of the compound (1) include, for example, 2,4-di-t-butyl-6-[1-(3,5-di-t-butyl-2-hydroxyphenyl)ethyl]phenyl acrylate, 2,4-di-t-amyl-6-[1-(3,5-di-t-amyl-2-hydroxyphenyl)ethyl]phenyl acrylate, 2,4-di-t-butyl-6-(3,5-di-t-butyl-2-hydroxy-benzyl)phenyl methacrylate, 2,4-di-t-butyl-6-[1-(3,5-di-t-butyl-2-hydroxyphenyl)ethyl]phenyl methacrylate, 2,4-di-t-amyl-6-[1-(3,5-di-t-amyl-2-hydroxyphenyl)ethyl]phenyl methacrylate, 2-t-butyl-6-(3-t-butyl-2-hydroxy-5-methylbenzyl)-4-methylphenyl methacrylate, 2-t-butyl-6-(3-t-butyl-2-hydroxy-5-methylbenzyl)-4-methylphenyl acrylate, 2-t-butyl-6-(3-t-butyl-2-hydroxy-5-methylbenzyl)-4-ethylphenyl methacrylate, 2-t-amyl-6-(3-t-amyl-2-hydroxy-5-methylbenzyl)-4-methylphenyl methacrylate, 2-t-amyl-6-(3-t-amyl-2-hydroxy-5-methylbenzyl)-4-methylphenyl acrylate and the like. More preferably mentioned are 2,4-di-t-amyl-6-[1-(3,5-di-t-amyl-2-hydroxyphenyl)ethyl]phenyl acrylate or 2-t-butyl-6-(3-t-butyl-2-hydroxy-5-methylbenzyl)-4-methylphenyl acrylate, and the like.

2,4-di-t-amyl-6-[1-(3,5-di-t-amyl-2-hydroxyphenyl) ethyl]phenyl acrylate is commercially marketed as Sumilizer GS(F) (registered trademark, manufactured by Sumitomo Chemical Co., Ltd., hereinafter, referred to as compound (1-1) in some cases), and 2-t-butyl-6-(3-t-butyl-2-hydroxy-5-methylbenzyl)-4-methylphenyl acrylate is commercially marketed as Sumilizer GM (registered trademark, manufactured by Sumitomo Chemical Co., Ltd.).

In the compound (2), $R^8$ and $R^9$ each independently represent a hydrogen atom, alkyl group having 1 to 9 carbon atoms, cycloalkyl group having 5 to 8 carbon atoms, alkylcycloalkyl group having 6 to 12 carbon atoms, aralkyl group having 7 to 12 carbon atoms or phenyl group.

Examples of the alkyl group include a methyl group, ethyl group, n-propyl group, isopropyl group, n-butyl group, isobutyl group, sec-butyl group, t-butyl group, n-pentyl group, t-amyl group ($-C(CH_3)_2CH_2CH_3$), 2-ethylhexyl group, cyclohexyl group and the like. Examples of the cycloalkyl group include a cyclopentyl group, cyclohexyl group and the like. Examples of the alkylcycloalkyl group include a methylcyclopentyl group, methylcyclohexyl group and the like. Examples of the aralkyl group include a benzyl group and the like.

Examples of the compound (2) include tris(2,4-di-t-butylphenyl) phosphite, tris(nonylphenyl)phosphite, tris(dinonylphenyl)phosphite and the like.

In the compound (3), n is an integer of 4 to 12, preferably 5 to 8, more preferably 6.

Examples of the compound (3) include sugar alcohols having 4 to 12 carbon atoms such as erythritol, threitol, arabinitol, xylitol, adonitol, allitol, iditol, galactitol, sorbitol, talitol, mannitol, volemitol, perseitol, octitol and the like.

The compound (3) may be an optically active substance such as a D form, L form and the like, or may be an optically inactive substance such as a DL form and the like.

As the compound (3), sugar alcohols in which n is 6 such as allitol, iditol, galactitol, sorbitol, talitol and mannitol represented as described below according to Fischer Projection are preferable, and sorbitol and mannitol are more preferable.

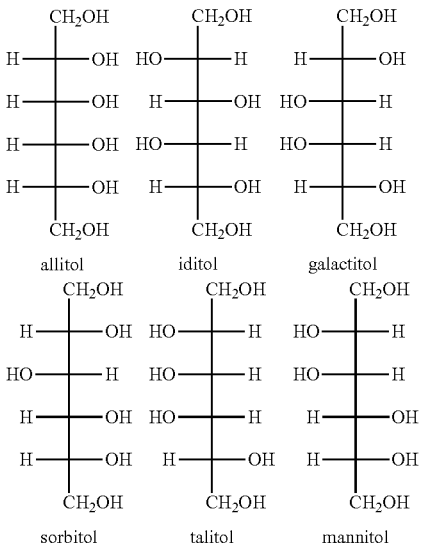

The stabilizer composition of the present invention contains the compound (1) or the compound (2) and the compound (3) preferably at a weight ratio of 9:1 to 1:9 (the compound (1) or the compound (2):the compound (3)), more preferably at a weight ratio of 8:2 to 2:8.

The stabilizer composition of the present invention can be used, as it is, as a processing stabilizer for a thermoplastic polymer. Also those containing suitable additives in a range not disturbing the effect of the present invention may be included in the stabilizer composition.

Examples of the above-described additives include antioxidants, ultraviolet absorbers, photostabilizers, metal deactivators, nucleating agents, lubricants, antistatic agents, flame retardants, fillers, pigments, inorganic fillers and the like other than the compound (1) or the compound (2), and the compound (3).

In the stabilizer composition of the present invention, the total weight of the compound (1) or the compound (2), the compound (3) and the above-described additives is preferably 50% or more, more preferably 90% or more.

Here, examples of the phenol antioxidant include alkylated monophenols such as 2,6-di-t-butyl-4-methylphenol, 2,4,6-tri-t-butylphenol, 2,6-di-t-butylphenol, 2-t-butyl-4,6-dimethylphenol, 2,6-di-t-butyl-4-ethylphenol, 2,6-di-t-butyl-4-n-butylphenol, 2,6-di-t-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-t-butyl-4-methoxymethylphenol, 2,6-di-nonyl-4-methylphenol, 2,4-dimethyl-6-(1'-methylundecyl-1'-yl)phenol, 2,4-dimethyl-6-(1'-methylheptadecyl-1'-yl)phenol, 2,4-dimethyl-6-(1'-methyltridecyl-1'-yl)phenol and mixtures thereof and the like, alkylthiomethylphenols such as 2,4-dioctylthiomethyl-6-t-butylphenol, 2,4-dioctylthiomethyl-6-methylphenol, 2,4-dioctylthiomethyl-6-ethylphenol, 2,6-didodecylthiomethyl-4-nonylphenol and mixtures thereof and the like, alkylidenebisphenols such as 2,2'-methylenebis(4-methyl-6-t-butylphenol), 2,2'-methylenebis(4-ethyl-6-t-butylphenol), 2,2'-methylenebis[4-methyl-6-α-methylcyclohexyl)phenol], 2,2'-methylenebis(4-methyl-6-cyclohexylphenol), 2,2'-methylenebis(4-methyl-6-nonylphenol), 2,2'-methylenebis(4,6-di-t-butylphenol), 2,2'-ethylidenebis(4,6-di-t-butylphenol), 2,2'-ethylidenebis(4-isobutyl-6-t-butylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(6-t-butyl-2-methylphenol), 4,4'-methylenebis(2,6-di-t-butylphenol), 4,4'-butylidenebis(3-methyl-6-t-butylphenol), 1,1-bis(4-hydroxyphenyl)cyclohexane, 1,1-bis(5-t-butyl-4-hydroxy-2-methylphenyl)butane, 2,6-bis(3-t-butyl-5-methyl-2-hydroxybenzyl)-4-methylphenol, 1,1,3-tris(5-t-butyl-4-hydroxy-2-methylphenyl)butane, 1,1-bis(5-t-butyl-4-hydroxy-2-methylphenyl)-3-n-dodecylmercaptobutane, ethylene glycol bis[3,3-bis-3'-t-butyl-4'-hydroxyphenyl]butyrate], bis(3-t-butyl-4-hydroxy-5-methylphenyl)dicyclopentadiene, bis[2-(3'-t-butyl-2'-hydroxy-5'-methylbenzyl)-6-t-butyl-4-methylphenyl]terephthalate, 1,1-bis(3,5-dimethyl-2-hydroxyphenyl)butane, 2,2-bis(3,5-di-t-butyl-4-hydroxyphenyl)propane, 2,2-bis(5-t-butyl-4-hydroxy-2-methylphenyl)-4-n-dodecylmercaptobutane, 1,1,5,5-tetra(5-t-butyl-4-hydroxy-2-methylphenyl)pentane and mixtures thereof and the like, and derivatives thereof, acylaminophenol derivatives such as 4-hydroxylauric anilide, 4-hydroxystearic anilide, octyl-N-(3,5-di-t-butyl-4-hydroxyphenyl)carbanate and mixtures thereof and the like, esters of β-(3,5-di-t-butyl-4-hydroxyphenyl)propionic acid with monohydric or polyhydric alcohols such as methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, Spiro glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2,2,2]octane and mixtures thereof and the like, hydroxylated thiodiphenyl ethers such as 2,2'-thiobis(6-t-butylphenol), 2,2'-thiobis(4-methyl-6-t-butylphenol), 2,2'-thiobis(4-octylphenol), 4,4'-thiobis(2-methyl-6-t-butylphenol), 4,4'-(2,6-dimethyl-4-hydroxyphenyl)disulfide and the like, benzyl derivatives such as O-benzyl derivatives, N-benzyl derivatives, S-benzyl derivatives and the like such as 3,5,3',5'-tetra-t-butyl-4,4'-dihydroxy dibenzyl ether, octadecyl-4-hydroxy-3,5-dimethylbenzylmercaptoacetate, tris(3,5-di-t-butyl-4-hydroxy-benzyl)amine, bis(4-t-butyl-3-hydroxy-2,6-dimethylbenzyl)dithio terephthalate, bis(3,5-di-t-butyl-4-hydroxybenzyl)sulfide, isooctyl-3,5-di-t-butyl-4-hydroxybenzyl mercaptoacetate and mixtures thereof and the like, triazine derivatives such as 2,4-bis(n-octylthio)-6-(4-hydroxy-3,5-di-t-butylanilino)-1,3,5-triazine, 2-n-octylthio-4,6-bis(4-hydroxy-3,5-di-t-butylanilino)-1,3,5-triazine, 2-n-octylthio-4,6-bis(4-hydroxy-3,5-di-t-butylphenoxy)-1,3,5-triazine, 2,4,6-tris(3,5-di-t-butyl-4-phenoxy)-1,3,5-triazine, tris(4-t-butyl-3-hydroxy-2,6-dimethylbenzyl)isocyanurate, tris(3,5-di-t-butyl-4-hydroxybenzyl)isocyanurate, 2,4,6-tris(3,5-di-t-butyl-4-hydroxyphenylethyl)-1,3,5-triazine, 2,4,6-tris(3,5-di-t-butyl-4-hydroxyphenylpropyl)-1,3,5-triazine, tris(3,5-dicyclohexyl-4-hydroxybenzyl)isocyanurate, tris[2-(3',5'-di-t-butyl-4'-hydroxycinnamoyloxy)ethyl]isocyanurate and mixtures thereof and the like, hydroxybenzylated malonate derivatives such as dioctadecyl-2,2-bis(3,5-di-t-butyl-2-hydroxybenzyl)malonate, dioctadecyl-2-(3-t-butyl-4-hydroxy-5-methylbenzyl)malonate, didodecylmercaptoethyl-2,2-bis(3,5-di-t-butyl-4-hydroxybenzyl)malonate, bis[4-(1,1,3,3-tetramethylbutyl)phenyl]-2,2-bis(3,5-di-t-butyl-4-hydroxybenzyl)malonate and mixtures thereof and the like, aromatic hydroxybenzyl derivatives such as 1,3,5-trimethyl-2,4,6-tris(3,5-di-t-butyl-4-hydroxybenzyl)benzene, 1,4-bis(3,5-di-t-butyl-4-hydroxybenzyl)-2,3,5,6-tetramethylbenzene, 2,4,6-tris(3,5-t-butyl-4-hydroxybenzyl)phenol and mixtures thereof and the like, benzyl phosphonate derivatives such as dimethyl-3,5-di-t-butyl-4-hydroxybenzyl phosphonate, diethyl-3,5-di-t-butyl-4-hydroxybenzyl phosphonate, dioctadecyl-3,5-di-t-butyl-4-hydroxybenzyl phosphonate, dioctadecyl-5-t-butyl-4-hydroxy-3-methylbenzyl phosphonate, calcium salt of 3,5-di-t-butyl-4-hydroxybenzylphosphonic acid monoester, and mixtures thereof and the like, esters of β-(5-t-butyl-4-hydroxy-3-methylphenyl)propionic acid with monohydric or polyhydric alcohols such as methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, Spiro glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2,2,2]octane and mixtures thereof and the like, esters of β-(3,5-dicyclohexyl-4-hydroxyphenyl)propionic acid with monohydric or polyhydric alcohols such as methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiro glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2,2,2]octane and mixtures thereof and the like, esters of 3,5-di-t-butyl-4-hydroxyphenylacetic acid with monohydric or polyhydric alcohols such as methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, Spiro glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2,2,2]octane and mixtures thereof and the like, amides of β-(3,5-di-t-butyl-4-hydroxyphenyl)propionic acid such as N,N'-bis[3-(3',5'-di-t-butyl-4'-hydroxyphenyl) propionyl]hydrazine, N,N'-bis[3-(3',5'-di-t-butyl-4'-hydroxyphenyl)propionyl]hexamethylenediamine, N,N'-bis[3-(3',5'-di-t-butyl-4'-hydroxyphenyl)propionyl]trimethylenediamine and mixtures thereof and the like, tocopherols such as α-tocopherol, β-tocopherol, γ-tocopherol, δ-tocopherol and mixtures thereof and the like; etc.

Examples of the hydroquinone and alkylated hydroquinone antioxidants include 2,6-di-t-butyl-4-methoxyphenol, 2,5-di-t-butylhydroquinone, 2,5-di-t-amylhydroquinone, 2,6-diphenyl-4-octadecyloxyphenol, 2,6-di-t-butylhydroquinone, 2,5-di-t-butyl-4-hydroxyanisole, 3,5-di-t-butyl-4-hydroxyphenyl stearate, bis(3,5-di-t-butyl-4-hydroxyphenyl)adipate and mixtures thereof and the like.

Examples of the sulfur-based antioxidant include dilauryl 3,3'-thiodipropionate, tridecyl 3,3'-thiodipropionate, dimyristyl 3,3'-thiodipropionate, distearyl 3,3'-thiodipropionate, lauryl stearyl 3,3'-thiodipropionate, neopentanetetrayl tetrakis(3-laurylthiopropionate) and the like.

Examples of the phosphorus-based antioxidant include triphenyl phosphite, tris(nonylphenyl)phosphite, tris(2,4-di-t-butylphenyl)phosphite, trilauryl phosphite, trioctadecyl phosphite, distearyl pentaerythritol diphosphite, diisodecyl pentaerythritol diphosphite, bis(2,4-di-t-butylphenyl)pentaerythritol diphosphite, bis(2,4-di-t-butyl-6-methylphenyl) pentaerythritol diphosphite, bis(2,6-di-t-butyl-4-methylphenyl)pentaerythritol diphosphite, bis(2,4,6-tri-t-butylphenyl) pentaerythritol diphosphite, tristearylsorbitol triphosphite, tetrakis(2,4-di-t-butylphenyl)-4,4'-diphenylene diphosphonite, 2,2'-methylenebis(4,6-di-t-butylphenyl)2-ethylhexyl phosphite, 2,2'-ethylidenebis(4,6-di-t-butylphenyl)fluorophosphite, bis(2,4-di-t-butyl-6-methylphenyl)ethyl phosphite, bis(2,4-di-t-butyl-6-methylphenyl)methyl phosphite, 2-(2,4,6-tri-t-butylphenyl)-5-ethyl-5-butyl-1,3,2-oxaphosphorynane, 2,2',2''-nitrilo[triethyl-tris(3,3',5,5'-tetrat-butyl-1,1'-biphenyl-2,2'-diyl)phosphite and mixtures thereof and the like.

Examples of the ultraviolet absorber include salicylate derivatives such as phenyl salicylate, 4-t-butylphenyl salicylate, 2,4-di-t-butylphenyl-3',5'-di-t-butyl-4'-hydroxybenzoate, 4-t-octylphenyl salicylate, bis(4-t-butylbenzoyl)resorcinol, benzoylresorcinol, hexadecyl 3',5'-di-t-butyl-4'-hydroxybenzoate, octadecyl 3',5'-di-t-butyl-4'-hydroxybenzoate, 2-methyl-4,6-di-t-butylphenyl 3',5'-di-t-butyl-4'-hydroxybenzoate and mixtures thereof and the like, 2-hydroxybenzophenone derivatives such as 2,4-dihydroxybenzophenone, 2-hydroxy-4-methoxybenzophenone, 2-hydroxy-4-octoxybenzophenone, 2,2'-dihydroxy-4-methoxybenzophenone, bis(5-benzoyl-4-hydroxy-2-methoxyphenyl)methane, 2,2',4,4'-tetrahydroxybenzophenone and mixtures thereof and the like, 2-(2'-hydroxyphenyl)benzotriazoles such as 2-(2-hydroxy-5-methylphenyl)benzotriazole, 2-(3',5'-di-t-butyl-2'-hydroxyphenyl)benzotriazole, 2-(5'-t-butyl-2'-hydroxyphenyl)benzotriazole, 2-(2'-hydroxy-5'-t-octylphenyl) benzotriazole, 2-(3-t-butyl-2-hydroxy-5-methylphenyl)-5-chlorobenzotriazole, 2-(3'-s-butyl-2'-hydroxy-5'-t-butylphenyl)benzotriazole, 2-(2'-hydroxy-4'-octyloxyphenyl)benzotriazole, 2-(3',5'-di-t-amyl-2'-hydroxyphenyl)benzotriazole, 2-[2'-hydroxy-3',5'-bis(α,α-dimethylbenzyl)phenyl]-2H-benzotriazole, 2-[(3'-t-butyl-2'-hydroxyphenyl)-5'-(2-octyloxycarbonylethyl)phenyl]-5-chlorobenzotriazole, 2-[3'-t-butyl-5'-[2-(2-ethylhexyloxy) carbonylethyl]-2'-hydroxyphenyl]-5-chlorobenzotriazole, 2-[3'-t-butyl-2'-hydroxy-5'-(2-methoxycarbonylethyl)phenyl]-5-chlorobenzotriazole, 2-[3'-t-butyl-2'-hydroxy-5'-(2-methoxycarbonylethyl)phenyl]benzotriazole, 2-[3'-t-butyl-2'-hydroxy-5-(2-octyloxycarbonylethyl)phenyl] benzotriazole, 2-[3'-t-butyl-2'-hydroxy-5'-[2-(2-ethylhexyloxy)carbonylethyl]phenyl]benzotriazole, 2-[2-hydroxy-3-(3,4,5,6-tetrahydrophthalimidemethyl)-5-methylphenyl]benzotriazole, 2-(3,5-di-t-butyl-2-hydroxyphenyl)-5-chlorobenzotriazole; a mixture of 2-(3'-dodecyl-2'-hydroxy-5'-methylphenyl)benzotriazole and 2-[3'-t-butyl-2'-hydroxy-5'-(2-isooctyloxycarbonylethyl) phenyl]benzotriazole; 2,2'-methylenebis[6-(2H-benzotriazol-2-yl)-4-(1,1,3,3-tetramethylbutyl)phenol, 2,2'-methylenebis[4-t-butyl-6-(2H-benzotriazol-2-yl)phenol]; a condensate of poly(3 to 11)(ethylene glycol) with 2-[3'-t-butyl-2'-hydroxy-5'-(2-methoxycarbonylethyl)phenyl]benzotriazole, a condensate of poly(3 to 11)(ethylene glycol) with methyl 3-[3-(2H-benzotriazol-2-yl)-5-t-butyl-4-hydroxyphenyl]propionate; 2-ethylhexyl-3-[3-t-butyl-5-(5-chloro-2H-benzotriazol-2-yl)-4-hydroxyphenyl]propionate, octyl 3-[3-t-butyl-5-(5-chloro-2H-benzotriazol-2-yl)-4-hydroxyphenyl]propionate, methyl 3-[3-t-butyl-5-(5-chloro-2H-benzotriazol-2-yl)-4-hydroxyphenyl]propionate, 3-[3-t-butyl-5-(5-chloro-2H-benzotriazol-2-yl)-4-hydroxyphenyl] propionic acid and mixtures thereof and the like; etc.

Examples of the photostabilizer include bis(2,2,6,6-tetramethyl-4-piperidyl)sebacate, bis((2,2,6,6-tetramethyl-4-piperidyl)succinate, bis(1,2,2,6,6-pentamethyl-4-piperidyl) sebacate, bis(N-octoxy-2,2,6,6-tetramethyl-4-piperidyl) sebacate, bis(N-benzyloxy-2,2,6,6-tetramethyl-4-piperidyl) sebacate, bis(N-cyclohexyloxy-2,2,6,6-tetramethyl-4-piperidyl)sebacate, bis(1,2,2,6,6-pentamethyl-4-piperidyl)2-(3,5-di-t-butyl-4-hydroxybenzyl)-2-butyl malonate, bis(1-acroyl-2,2,6,6-tetramethyl-4-piperidyl) 2,2-bis(3,5-di-t-butyl-4-hydroxybenzyl)-2-butyl malonate, bis(1,2,2,6,6-pentamethyl-4-piperidyldecane dioate, 2,2,6,6-tetramethyl-4-piperidyl methacrylate, 4-[3-(3,5-di-t-butyl-4-hydroxyphenyl)propionyloxy]-1-[2-(3-(3,5-di-t-butyl-4-hydroxyphenyl)propionyloxy)ethyl]-2,2,6,6-tetramethylpiperidine, 2-methyl-2-(2,2,6,6-tetramethyl-4-piperidyl)amino-N-(2,2,6,6-tetramethyl-4-piperidyl) propionamide, tetrakis(2,2,6,6-tetramethyl-4-piperidyl) 1,2,3,4-butane tetracarboxylate, tetrakis(1,2,2,6,6-pentamethyl-4-piperidyl) 1,2,3,4-butane tetracarboxylate, a mixed ester of 1,2,3,4-butanetetracarboxylic acid with 1,2,2,6,6-pentamethyl-4-piperidinol and 1-tridecanol, hindered amine photostabilizers such as a mixed ester of 1,2,3,4-butanetetracarboxylic acid with 1,2,2,6,6-pentamethyl-4-piperidinol and 3,9-bis(2-hydroxy-1,1-dimethylethyl)-2,4,8,10-tetraoxaspiro[5.5]undecane, a mixed ester of 1,2,3,4-butanetetracarboxylic acid with 2,2,6,6-tetramethyl- 4-piperidinol and 3,9-bis(2-hydroxy-1,1-dimethylethyl)-2,4,8,10-tetraoxaspiro[5.5]undecane, a polycondensate of dimethyl succinate with 1-(2-hydroxyethyl)-4-hydroxy-2,2,6,6-tetramethylpiperidine; poly[(6-morpholino-1,3,5-triazine-2,4-diyl)((2,2,6,6-tetramethyl-4-piperidyl)imino)hexamethylene((2,2,6,6-tetramethyl-4-piperidyl)imino)], poly[(6-(1,1,3,3-tetramethylbutyl)imino-1,3,5-triazine-2,4-diyl((2,2,6,6-tetramethyl-4-piperidyl)imino)hexamethylene((2,2,6,6-tetramethyl-4-piperidyl)aimino)); a polycondensate of N,N'-bis(2,2,6,6-tetramethyl-4-piperidyl)hexamethylenediamine with 1,2-dibromoethane; N,N',4,7-tetrakis[4,6-bis(N-butyl-N-(2,2,6,6-tetramethyl-4-piperidyl)amino)-1,3,5-triazine-2-yl]-4,7-diazadecane-1,10-diamine, N,N',4-tris[4,6-bis(N-butyl-N-(2,2,6,6-tetramethyl-4-piperidyl)amino)-1,3,5-triazine-2-yl]-4,7-diazadecane-1,10-diamine, N,N',4,7-tetrakis[4,6-bis(N-butyl-N-(1,2,2,6,6-pentamethyl-4-piperidyl)amino)-1,3,5-triazine-2-yl]-4,7-diazadecane-1,10-diamine, N,N',4-tris[4,6-bis(N-butyl-N-(1,2,2,6,6-pentamethyl-4-piperidyl)amino)-1,3,5-triazine-2-yl]-4,7-diazadecane-1,10-diamine and mixtures thereof and the like, acrylate photostabilizers such as ethyl α-cyano-β,β-diphenyl acrylate, isooctyl α-cyano-β,β-diphenyl acrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline and mixtures thereof and the like, nickel photostabilizers such as a nickel complex of 2,2'-thiobis-[4-(1,1,3,3-tetramethylbutyl)phenol], nickel dibutyl dithiocarbamate, a nickel salt of a monoalkyl ester, a nickel complex of ketoxime, and mixtures thereof and the like, oxamide photostabilizers such as 4,4'-dioctyloxyoxanilide, 2,2'-diethoxyoxanilide, 2,2'-dioctyloxy-5,5'-di-t-butylanilide, 2,2'-didodecyloxy-5,5'-di-t-butylanilide, 2-ethoxy-2'-ethyloxanilide, N,N'-bis(3-dimethylaminopropyl)oxamide, 2-ethoxy-5-t-butyl-2'-ethoxyanilide, 2-ethoxy-5,4'-di-t-butyl-2'-ethyloxanilide and mixtures thereof and the like, 2-(2-hydroxyphenyl)-1,3,5-triazine photostabilizers such as 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-[2,4-dihydroxyphenyl-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethylphenyl)-1,3,5-triazine, 2-[2-hydroxy-4-(2-hydroxy-3-octyloxypropoxy)phenyl]-4,6-bis(2,4-dimethylphenyl)-1,3,5-triazine and mixtures thereof and the like; etc.

Examples of the stabilizers include also hydroxylamines such as N,N-dibenzylhydroxyamine, N,N-diethylhydroxyamine, N,N-dioctylhydroxyamine, N,N-dilaurylhydroxyamine, N,N-ditetradecylhydroxyamine, N,N-dihexadecylhydroxyamine, N,N-dioctadecylhydroxyamine, N-hexadecyl-N-octadecylhydroxyamine, N-heptadecyl-N-octadecylhydroxyamine and mixtures thereof and the like; etc., in addition to the above-described examples.

Examples of the lubricant include aliphatic hydrocarbons such as paraffins, waxes and the like; higher aliphatic acids having 8 to 22 carbon atoms; metal (Al, Ca, Mg, Zn) salts of higher aliphatic acids having 8 to 22 carbon atoms; aliphatic alcohols having 8 to 22 carbon atoms; poly glycols; esters of higher aliphatic acids having 4 to 22 carbon atoms with aliphatic mono-hydric alcohols having 4 to 18 carbon atoms; higher aliphatic amides having 8 to 22 carbon atoms; silicone oils; rosin derivatives; and the like. Among these additives other than the compound (1) or the compound (2) and the compound (3), preferably used are phenol antioxidants, phosphorus-based antioxidants, sulfur-based antioxidants, ultraviolet absorbers and hindered amine photostabilizers, other than the compound (1) or the compound (2) and the compound (3).

Particularly preferable phenol antioxidants other than the compound (1) or the compound (2) and the compound (3) include 2,6-di-t-butyl-4-methylphenol, 2,4,6-tri-t-butylphenol, 2,4-dioctylthiomethyl-6-methylphenol, 2,2'-thiobis(6-t-butylphenol), 2,2'-methylenebis(4-methyl-6-t-butylphenol), 2,2'-methylenebis(4-ethyl-6-t-butylphenol), 2,2'-methylenebis[4-methyl-6-(α-methylcyclohexyl)phenol], 2,2'-methylenebis(4-methyl-6-cyclohexylphenol), 2,2'-methylenebis(4,6-di-t-butylphenol), 2,2'-ethylidenebis(4,6-di-t-butylphenol), 4,4'-methylenebis(6-t-butyl-2-methylphenol), 4,4'-methylenebis(2,6-di-t-butylphenol), 4,4'-butylidenebis(3-methyl-6-t-butylphenol), 1,1-bis(4-hydroxyphenyl)cyclohexane, 1,1-bis(5-t-butyl-4-hydroxy-2-methylphenyl)butane, 1,1,3-tris(5-t-butyl-4-hydroxy-2-methylphenyl)butane, ethylene glycol bis[3,3-bis-3'-t-butyl-4'-hydroxyphenyl]butyrate], 2,4,6-tris(3,5-di-t-butyl-4-phenoxy)-1,3,5-triazine, tris(4-t-butyl-3-hydroxy-2,6-dimethylbenzyl)isocyanurate, bis(3,5-di-t-butyl-4-hydroxybenzyl)isocyanurate, tris[2-(3',5'-di-t-butyl-4'-hydroxycinnamoyloxy)ethyl]isocyanurate, diethyl-3,5-di-t-butyl-4-hydroxy-benzyl phosphonate, di-n-octadecyl-3,5-di-t-butyl-4-hydroxybenzyl phosphonate; calcium salt of 3,5-di-t-butyl-4-hydroxybenzylphosphonic acid monoester; n-octadecyl 3-(3,5-di-t-butyl-4-hydroxyphenyl)propionate, neopentanetetraylkekis(3,5-di-t-butyl-4-hydroxycinnamate), thiodiethylenebis(3,5-di-t-butyl-4-hydroxycinnamate), 1,3,5-trimethyl-2,4,6-tris(3,5-di-t-butyl-4-hydroxybenzyl)benzene, 3,6-dioxaoctamethylenebis(3,5-di-t-butyl-4-hydroxycinnamate), hexamethylenebis(3,5-di-t-butyl-4-hydroxycinnamate), 3,9-bis[2-(3-(3-t-butyl-4-hydroxy-5-methylphenyl)propionyloxy)-1,1-dimethylethyl]-2,4,8,10-tetraoxaspiro[5.5]undecane, N,N'-bis[3-(3',5'-di-t-butyl-4'-hydroxyphenyl)propionyl]hydrazine, N,N'-bis[3-(3',5'-di-t-butyl-4'-hydroxyphenyl)propionyl]hexamethylenediamine and the like, and these can be used each singly or in combination of two or more.

Particularly preferable phosphorus-based antioxidants include tris(nonylphenyl)phosphite, tris(2,4-di-t-butylphenyl)phosphite, distearylpentaerythritol diphosphite, bis(2,4-di-t-butylphenyl)pentaerythritol diphosphite, bis(2,4-di-t-butyl-6-methylphenyl)pentaerythritol diphosphite, bis(2,6-di-t-butyl-4-methylphenyl)pentaerythritol diphosphite, tetrakis(2,4-di-t-butylphenyl)-4,4'-diphenylene diphosphonite, 2,2'-methylenebis(4,6-di-t-butylphenyl)2-ethylhexyl phosphite, 2,2'-ethylidenebis(4,6-di-t-butylphenyl)fluorophosphite, bis(2,4-di-t-butyl-6-methylphenyl)ethyl phosphite, 2-(2,4,6-tri-t-butylphenyl)-5-ethyl-5-butyl-1,3,2-oxaphosphorynane, 2,2',2"-nitrilo[triethyl-tris(3,3',5,5'-tetra-t-butyl-1,1'-biphenyl-2,2'-diyl)phosphite and the like, and these can be used each singly or in combination of two or more.

Examples of preferable ultraviolet absorbers include phenyl salicylate, 4-t-butylphenyl salicylate, 2,4-di-t-butylphenyl 3',5'-di-t-butyl-4'-hydroxybenzoate, 4-t-octylphenylsalicylate, 2,4-dihydroxybenzophenone, 2-hydroxy-4-methoxybenzophenone, 2-hydroxy-4-octoxybenzophenone, 2,2'-dihydroxy-4-methoxybenzophenone, bis(5-benzoyl-4-hydroxy-2-methoxyphenyl)methane, 2,2',4,4'-tetrahydroxybenzophenone, 2-(2-hydroxy-5-methylphenyl)benzotriazole, 2-(3',5'-di-t-butyl-2'-hydroxyphenyl)benzotriazole, 2-(5'-t-butyl-2'-hydroxyphenyl)benzotriazole, 2-(2'-hydroxy-5'-t-octylphenyl)benzotriazole, 2-(3-t-butyl-2-hydroxy-5-methylphenyl)-5-chlorobenzotriazole, 2-(3'-s-butyl-2'-hydroxy-5'-t-butylphenyl)benzotriazole, 2-(2'-hydroxy-4'-octyloxyphenyl)benzotriazole, 2-(3',5'-di-t-amyl-2'-hydroxyphenyl)benzotriazole, 2-[2'-hydroxy-3',5'-bis(α,α-dimethylbenzyl)phenyl]-2H-benzotriazole and the like, and these can be used each singly or in combination of two or more.

Examples of preferable photostabilizers include bis(2,2,6,6-tetramethyl-4-piperidyl)sebacate, bis(1,2,2,6,6-pentamethyl-4-piperidyl)sebacate, bis(N-octoxy-2,2,6,6-tetramethyl-4-piperidyl)sebacate, bis(N-benzyloxy-2,2,6,6-tetramethyl-4-piperidyl)sebacate, bis(N-cyclohexyloxy-2,2,6,6-tetramethyl-4-piperidyl)sebacate, bis(1,2,2,6,6-pentamethyl-4-piperidyl) 2-(3,5-di-t-butyl-4-hydroxybenzyl)-2-butyl malonate, bis(1-acroyl-2,2,6,6-tetramethyl-4-piperidyl) 2,2-bis(3,5-di-t-butyl-4-hydroxybenzyl)-2-butyl malonate, bis(2,2,6,6-tetramethyl-4-piperidyl)succinate, 2,2,6,6-tetramethyl-4-piperidyl methacrylate, 4-[3-(3,5-di-t-butyl-4-hydroxyphenyl)propionyloxy]-1-[2-(3-(3,5-di-t-butyl-4-hydroxyphenyl)propionyloxy)ethyl]-2,2,6,6-tetramethylpiperidine, 2-methyl-2-(2,2,6,6-tetramethyl-4-piperidyl)amino-N-(2,2,6,6-tetramethyl-4-piperidyl)propionamide, tetrakis(2,2,6,6-tetramethyl-4-piperidyl) 1,2,3,4-butane tetracarboxylate, tetrakis(1,2,6,6-pentamethyl-4-piperidyl) 1,2,3,4-butane tetracarboxylate, a mixed ester of 1,2,3,4-butanetetracarboxylic acid with 1,2,2,6,6-pentamethyl-4-piperidinol and 1-tridecanol, a mixed ester of 1,2,3,4-butanetetracarboxylic acid with 2,2,6,6-tetramethyl-4-piperidinol and 1-tridecanol, a mixed ester of 1,2,3,4-butanetetracarboxylic acid with 1,2,2,6,6-pentamethyl-4-piperidinol and 3,9-bis(2-hydroxy-1,1-dimethylethyl)-2,4,8,10-tetraoxaspiro[5.5]undecane, a mixed ester of 1,2,3,4-butanetetracarboxylic acid with 2,2,6,6-tetramethyl-4-piperidinol and 3,9-bis(2-hydroxy-1,1-dimethylethyl)-2,4,8,10-tetraoxaspiro[5.5]undecane, a polycondensate of dimethyl succinate with 1-(2-hydroxyethyl)-4-hydroxy-2,2,6,6-tetramethylpiperidine; poly[(6-morpholino-1,3,5-triazine-2,4-diyl)((2,2,6,6-tetramethyl-4-piperidyl)imino)hexamethylene((2,2,6,6-tetramethyl-4-piperidyl)imino)], poly[(6-(1,1,3,3-tetramethylbutyl)-1,3,5-triazine-2,4-diyl) ((2,2,6,6-tetramethyl-4-piperidyl)imino) hexamethylene((2,2,6,6-tetramethyl-4-piperidyl)imino)] and the like, and these can be used each singly or in combination of two or more.

The method of producing the stabilizer composition of the present invention includes, for example, a method in which the compound (1) or the compound (2) and the compound (3), and if necessary, the above-described additives, are mixed by a mixer such as a Henschel mixer, super mixer, high speed mixer and the like, for example, a method in which a mixture of the compound (1) or the compound (2), the compound (3) and additives is further extrusion-molded, for example, a method in which a mixture of the compound (1) or the compound (2), the compound (3) and additives is further stirred and granulated; and other methods.

The thermoplastic polymer composition of the present invention is a thermoplastic polymer composition comprising a thermoplastic polymer, the compound (1) or the compound (2) and the compound (3), and is characterized in that the total weight of the compound (1) or the compound (2) and the compound (3) is preferably 0.001 to 3 parts by weight, more preferably 0.02 to 2 parts by weight, further preferably 0.02 to 1 parts by weight with respect to 100 parts by weight of the thermoplastic polymer and the weight ratio of the compound (1) or the compound (2) and the compound (3) (the compound (1) or the compound (2):the compound (3)) is preferably 9:1 to 1:9, more preferably 2:8 to 8:2.

Here, the thermoplastic polymer includes polyethylene resins (high density polyethylene (HD-PE), low density polyethylene (LD-PE), linear low density polyethylene (LLDPE), ethylene vinyl alcohol copolymer (EVOH), ethylene-ethyl acrylate copolymer, ethylene-vinyl acetate copolymer (EVA) and the like), polypropylene resins (crystalline propylene homopolymer, propylene-ethylene random copolymer, propylene α-olefin random copolymer, propylene-ethylene-α-olefin copolymer, polypropylene block copolymer composed of a propylene homopolymer component or copolymer components consisting predominantly of propylene, and propylene and ethylene and/or α-olefin copolymer components; and the like), methylpentene polymer, polystyrene resins (polystyrenes such as poly(p-methylstyrene), poly(α-methylstyrene) and the like; acrylonitrile-styrene copolymer, acrylonitrile-butadiene-styrene copolymer (ABS), special acrylic rubber-acrylonitrile-styrene copolymer, acrylonitrile-chlorinated polyethylene-styrene copolymer and the like), polybutadiene resins (polybutadiene rubber (BR), styrene butadiene copolymer (SBR), styrene butadiene block copolymer (SBS), high impact polystyrene (HI-PS) modified with BR or SBR or SBS; and the like), chlorinated polyethylene, polychloroprene, chlorinated rubber, polyvinyl chloride, polyvinylidene chloride, methacrylic resin, fluorine resin, polyacetal, grafted polyphenylene ether resin, polyphenylene sulfide resin, polyurethane, polyamide, polyester resins (for example, polyethylene terephthalate, polybutylene terephthalate and the like), polylactic resin (PLA), polycarbonate, polyacrylate, polysulfone, poly ether ether ketone, poly ether sulfone, aromatic polyester resin, diallyl phthalate prepolymer, silicone resin, 1,2-polybutadiene, polyisoprene, butadiene/acrylonitrile copolymer, ethylene-methyl methacrylate copolymer, and the like, and from the standpoint of molding processability, preferable are polyethylene resins, polypropylene resins, polystyrene resins and polybutadiene resins, more preferable are ethylene resins and polybutadiene resins.

The method of producing the thermoplastic polymer composition includes, for example, a method in which in kneading a thermoplastic polymer, the compound (1) or the compound (2) and the compound (3), and if necessary additives, are blended separately, for example, a method comprising a step of mixing the compound (1) or the compound (2) and the compound (3), and if necessary additives, to produce a stabilizer composition and a step of mixing the stabilizer composition obtained in the above-described step with a thermoplastic polymer; and other methods. From the standpoint of dispersibility of the compound (1) or the compound (2) and the compound (3) in a thermoplastic polymer, the latter method is preferable.

Here, as the step of producing a stabilizer composition, the methods exemplified for the above-described production method of a stabilizer composition are exemplified likewise.

Further specific explanations of the step of mixing the stabilizer composition with a thermoplastic polymer include, for example, a method in which a thermoplastic polymer and the above-described stabilizer composition are dry-blended, then, melt-kneaded by a single screw or multi screw extruder, then, extruded to obtain pellets of a thermoplastic polymer composition, for example, a method in which a solution prepared by dissolving a stabilizer composition in a solvent such as cyclohexane and the like is added to a polymer solution after completion of polymerization of a thermoplastic polymer, to remove the solvent; and other methods.

EXAMPLES

The present invention will be illustrated more in detail by examples and comparative examples mentioned below. Parts and % are by weight unless otherwise stated.

Example 1 (Production of Stabilizer Composition)

Zero point four eight (0.48) parts of 2,4-di-t-amyl-6-[1-(3,5-di-t-amyl-2-hydroxyphenyl)ethyl]phenyl acrylate (Sumilizer GS(F), registered trademark, manufactured by Sumitomo Chemical Co., Ltd., hereinafter, referred to as compound (1-1) in some cases) as the compound (1) and 0.12 parts of mannitol as the compound (3) were mixed, to produce a stabilizer composition.

Example 2 (Production of Stabilizer Composition)

Zero point four eight (0.48) parts of 2-t-butyl-6-(3-t-butyl-2-hydroxy-5-methylbenzyl)-4-methylphenyl acrylate (Sumilizer GM, registered trademark, manufactured by Sumitomo Chemical Co., Ltd., hereinafter, referred to as compound (1-2) in some cases) as the compound (1) and 0.12 parts of sorbitol as the compound (3) were mixed, to produce a stabilizer composition.

Example 3 (Production of Thermoplastic Polymer Composition)

One hundred (100) parts of a styrene-butadiene block copolymer manufactured by Asahi Kasei Corporation and 0.6 parts of the stabilizer composition obtained in Example 1 were dry-blended, then, kneaded by using a 30 mm Ø single screw extruder (manufactured by Tanabe Plastics Machinery Co., Ltd., VS30-28 type extruder) at 230° C. and a screw rotation speed of 50 rpm, to obtain pellets of a thermoplastic polymer composition.

Examples 4, 5 (Production of Thermoplastic Polymer Composition) and Comparative Example 1

Pellets of a thermoplastic polymer composition were obtained in the same manner as in Example 3, excepting that parts of the compound (1-1) and mannitol in the stabilizer composition to be used were changed, respectively, to parts shown in Table 1, in Example 3.

Test Example 1 (Test of Processing Stability under Static Condition)

The pellets obtained respectively in Examples 3 to 5 and Comparative Example 1 were subjected to a retention MFR test for evaluation of processability in operation in extrusion processing. In the test, the temperature in a cylinder of Melt Indexer (L217-E14011, manufactured by Techno Seven Ltd.) was adjusted to 270° C., a thermoplastic polymer composition was allowed to reside in the cylinder for 30 minutes, then, MFR under a load of 2.16 kg was measured, according to JIS K 7210. The results are shown in Table 1. Larger the MFR value, more excellent processing stability under static condition.

The processing stability improvement rate in Table 1 is a value calculated according to the following formula.

(Processing stability improvement rate)=[(MFR value measured in example)−(MFR value measured in Comparative Example 1)]/(MFR value measured in Comparative Example 1)×100(%)

TABLE 1

| | Compound (1-1) parts [weight ratio] | Mannitol parts [weight ratio] | MFR value | Processing stability improvement rate (%) |
|---|---|---|---|---|
| Example 3 | 0.48 [8] | 0.12 [2] | 14.1 | 9.3 |
| Example 4 | 0.30 [5] | 0.30 [5] | 16.7 | 29.5 |
| Example 5 | 0.12 [2] | 0.48 [8] | 14.2 | 10.1 |
| Comparative Example 1 | 0.60 [10] | 0.00 [0] | 12.9 | 0 |

Example 6 (Production of Thermoplastic Polymer Composition)

Pellets of a thermoplastic polymer composition were obtained in the same manner as in Example 3, excepting that, in Example 3, the stabilizer composition obtained in Example 2 was used instead of the stabilizer composition obtained in Example 1.

Example 7 (Production of Thermoplastic Polymer Composition) and Comparative Example 2

Pellets of a thermoplastic polymer composition were obtained in the same manner as in Example 6, excepting that parts of the compound (1-2) and sorbitol in the stabilizer composition to be used were changed, respectively, to parts shown in Table 2, in Example 6.

Test Example 2 (Test of Processing Stability under Static Condition)

The pellets obtained respectively in Examples 6 and 7 and Comparative Example 2 were subjected to a retention MFR test for evaluation of processability in operation in extrusion processing, in the same manner as in Test Example 1.
The results are shown in Table 2.

TABLE 2

| | Compound (1-2) parts [weight ratio] | Sorbitol parts [weight ratio] | MFR value | Processing stability improvement rate (%) |
|---|---|---|---|---|
| Example 6 | 0.48 [8] | 0.12 [2] | 13.4 | 318.7 |
| Example 7 | 0.30 [5] | 0.30 [5] | 14.2 | 343.7 |
| Comparative Example 2 | 0.60 [10] | 0.00 [0] | 3.2 | 0 |

Example 8 (Production of Stabilizer Composition)

Zero point four eight (0.48) parts of tris(2,4-di-t-butylphenyl)phosphite (Irgafos 168 manufactured by Ciba Japan K.K., registered trademark) as the compound (2) and 0.12 parts of mannitol as the compound (3) were mixed, to produce a stabilizer composition.

Example 9 (Production of Thermoplastic Polymer Composition)

One hundred (100) parts of a styrene-butadiene block copolymer (Asaflex 830 manufactured by Asahi Kasei Corporation, registered trademark) and 0.6 parts of the stabilizer composition obtained in Example 8 were kneaded by using Laboplasto Mill (4C-150) manufactured by Toyo Seiki Seisaku-sho, Ltd. at 250° C. and a rotation speed of 100 rpm under an open state, to obtain a thermoplastic polymer composition.

Examples 10, 11 (Production of Thermoplastic Polymer Composition) and Comparative Example 3

A thermoplastic polymer composition was obtained in the same manner as in Example 9, excepting that parts of the compound (2) and mannitol in the stabilizer composition to be used were changed, respectively, to parts shown in Table 6, in Example 9.

Test Example 3 (Test of Processing Stability under Dynamic Condition)

In Examples 9 to 11 and Comparative Example 6, the time until the torque of Laboplasto Mill reached the maximum value was measured as the build up time. Longer the build up time, more excellent the processing stability under dynamic condition. The results are shown in Table 3.

The processing stability improvement rate in Table 3 is a value calculated according to the following formula.

(Processing stability improvement rate)=[(build up time in example)−(build up time in Comparative Example 3)]/(build up time in Comparative Example 3)×100(%)

TABLE 3

|  | Irgafos 168 parts [weight ratio] | Mannitol parts [weight ratio] | Build up time (min) | Processing stability improvement rate (%) |
|---|---|---|---|---|
| Example 9 | 0.48 [8] | 0.12 [2] | 21.9 | 65.9 |
| Example 10 | 0.30 [5] | 0.30 [5] | 19.3 | 46.2 |
| Example 11 | 0.12 [2] | 0.48 [8] | 16.3 | 23.5 |
| Comparative Example 3 | 0.60 [10] | 0 [0] | 13.2 | 0 |

Example 12 (Production of Stabilizer Composition)

A stabilizer composition was produced in the same manner as in Example 8, excepting that sorbitol was used instead of mannitol, in example 8.

Example 13 (Production of Thermoplastic Polymer Composition)

On hundred (100) parts of a styrene-butadiene block copolymer manufactured by Asahi Kasei Corporation and the stabilizer composition obtained in Example 8 were dry-blended, then, kneaded by using a 30 mm Ø single screw extruder (manufactured by Tanabe Plastics Machinery Co., Ltd., VS30-28 type extruder) at 230° C. and a screw rotation speed of 50 rpm, to obtain pellets of a thermoplastic polymer composition.

Example 14 (Production of Thermoplastic Polymer Composition)

Pellets of a thermoplastic polymer composition were obtained in the same manner as in Example 13, excepting that, in Example 13, the stabilizer composition obtained in Example 12 was used instead of the stabilizer composition obtained in Example 8.

Comparative Example 4

Pellets of a thermoplastic polymer composition were obtained in the same manner as in Example 13, excepting that, in Example 13, Irgafos 168 was used instead of the stabilizer composition obtained in Example 8.

Test Example 4 (Test of Processing Stability under Static Condition)

The pellets obtained respectively in Examples 13 and 14 and Comparative Example 7 were subjected to a retention MFR test for evaluation of processability in operation in extrusion processing. In the test, the temperature in a cylinder of Melt Indexer (L217-E14011, manufactured by Techno Seven Ltd.) was adjusted to 270° C., a thermoplastic polymer composition was allowed to reside in the cylinder for 30 minutes, then, MFR under a load of 2.16 kg was measured, according to JIS K 7210. The results are shown in Table 4. Larger the MFR value, more excellent the processing stability under static condition.

The processing stability improvement rate in Table 4 is a value calculated according to the following formula.

(Processing stability improvement rate)=(MFR value measured in example−MFR value measured in Comparative Example 4)/MFR value measured in Comparative Example 4×100

TABLE 4

|  | Irgafos 168 parts [weight ratio] | Compound (3) parts [weight ratio] | MFR value | Processing stability improvement rate (%) |
|---|---|---|---|---|
| Example 13 | 0.48 [8] | mannitol 0.12 [2] | 16.8 | 200.0 |
| Example 14 | 0.48 [8] | sorbitol 0.12 [2] | 17.8 | 217.9 |
| Comparative Example 4 | 0.60 [10] | none 0.00 [0] | 5.6 | 0 |

Example 15 (Production of Stabilizer Composition)

Zero point one (0.1) part of tris(2,4-di-t-butylphenyl)phosphite (Irgafos 168 manufactured by Ciba Japan K.K., registered trademark) as the compound (2) and 0.01 part of mannitol as the compound (3) were mixed, to produce a stabilizer composition.

Example 16 (Production of Stabilizer Composition)

A stabilizer composition was produced in the same manner as in Example 15, excepting that, in Example 15, sorbitol was used instead of mannitol.

Example 17 (Production of Thermoplastic Polymer Composition)

One hundred (100) parts of a polypropylene manufactured by Sumitomo Chemical Co., Ltd. and the stabilizer composition obtained in Example 15 were dry-blended, then, kneaded by using a 30 mm Ø single screw extruder (manufactured by Tanabe Plastics Machinery Co., Ltd., VS30-28 type extruder) at 230° C. and a screw rotation speed of 50 rpm, to obtain pellets of a thermoplastic polymer composition.

Example 18 (Production of Thermoplastic Polymer Composition)

Pellets of a thermoplastic polymer composition were obtained in the same manner as in Example 17, excepting that, in Example 17, the stabilizer composition obtained in Example 16 was used instead of the stabilizer composition obtained in Example 15.

Comparative Example 5

Pellets of a thermoplastic polymer composition were obtained in the same manner as in Example 17, excepting that, in Example 17, 0.1 part of Irgafos 168 was used instead of the stabilizer composition obtained in Example 35.

Test Example 5 (Test of Processing Stability under Static Condition)

The pellets obtained respectively in Examples 17 and 18 and Comparative Example 5 were subjected to a retention MFR test for evaluation of processability in operation in extrusion processing. In the test, the temperature in a cylinder of Melt Indexer (L217-E14011, manufactured by Techno Seven Ltd.) was adjusted to 270° C., a thermoplastic polymer composition was filled in the cylinder and MFR under a load of 2.16 kg was measured, then, a thermoplastic polymer composition was allowed to reside in the cylinder for 30 minutes, then, MFR under a load of 2.16 kg was measured, according to JIS K 7210. The results are shown in Table 5.

The MFR rising suppression rate in Table 5 is a value calculated according to the following formula. In the case of a polypropylene, larger the MFR rising suppression rate, more excellent the processability, since decomposition progresses owing to heat in processing.

MFR rising suppression rate (%)=(MFR value after retention for 30 minutes in Comparative Example 5−MFR value after retention for 30 minutes in example)/MFR value after retention for 30 minutes in Comparative Example 5×100

TABLE 5

| | Irgafos 168 parts [weight ratio] | Compound (3) parts [weight ratio] | MFR value after retention for 30 minutes | MFR rising suppression rate (%) |
|---|---|---|---|---|
| Example 17 | 0.1 [10] | mannitol 0.01 [1] | 13.5 | 15.6 |
| Example 18 | 0.1 [10] | sorbitol 0.01 [1] | 10.4 | 35.0 |
| Comparative Example 5 | 0.1 [10] | none 0.00 [0] | 16.0 | 0 |

INDUSTRIAL APPLICABILITY

The stabilizer composition of the present invention imparts excellent processing stability to a thermoplastic polymer composition containing the stabilizer composition of the present invention.

The thermoplastic polymer composition containing the stabilizer composition of the present invention is excellent in processing stability both under static condition and dynamic condition, thus, can be suitably used in application of molding processing such as extrusion molding, injection molding and the like.

The invention claimed is:

1. A stabilizer composition comprising 2,4-di-t-amyl-6-[1-(3,5-di-t-amyl-2-hydroxyphenyl)ethyl]phenyl acrylate or 2-t-butyl-6-(3-t-butyl-2-hydroxy-5-methylbenzyl)-4-methylphenyl acrylate; or
tris(2,4-di-t-butylphenyl)phosphite; and
sorbitol or mannitol;
wherein a weight ratio of 2,4-di-t-amyl-6-[1-(3,5-di-t-amyl-2-hydroxyphenyl)ethyl]-phenyl acrylate or 2-t-butyl-6-(3-t-butyl-2-hydroxy-5-methylbenzyl)-4-methylphenyl acrylate to tris(2,4-di-t-butylphenyl)phosphite is 8:2 to 2:8.

2. A thermoplastic polymer composition comprising a thermoplastic polymer, 2,4-di-t-amyl-6-[1-(3,5-di-t-amyl-2-hydroxyphenyl)ethyl]phenyl acrylate or 2-t-butyl-6-(3-t-butyl-2-hydroxy-5-methylbenzyl)-4-methylphenyl acrylate; or
tris(2,4-di-t-butylphenyl)phosphite; and
sorbitol or mannitol;
wherein the total weight of 2,4-di-t-amyl-6-[1-(3,5-di-t-amyl-2-hydroxyphenyl)ethyl]-phenyl acrylate or 2-t-butyl-6-(3-t-butyl-2-hydroxy-5-methylbenzyl)-4-methylphenyl acrylate or tris(2,4-di-t-butylphenyl)phosphite and sorbitol or mannitol is 0.001 to 3 parts by weight with respect to 100 parts by weight of the thermoplastic polymer;
wherein a weight ratio of 2,4-di-t-amyl-6-[1-(3,5-di-t-amyl-2-hydroxyphenyl)ethyl]-phenyl acrylate or 2-t-butyl-6-(3-t-butyl-2-hydroxy-5-methylbenzyl)-4-methylphenyl acrylate to tris(2,4-di-t-butylphenyl)phosphite is 8:2 to 2:8.

3. The thermoplastic polymer composition according to claim 2, wherein the thermoplastic polymer is polyethylene resins, polypropylene resins or styrene butadiene copolymer.

4. A method of producing a thermoplastic polymer composition, having a step of mixing the stabilizer composition according to claim 1 with a thermoplastic polymer.

5. The method according to claim 4, wherein the thermoplastic polymer is polyethylene resins, polypropylene resins or styrene butadiene copolymer.

* * * * *